UNITED STATES PATENT OFFICE.

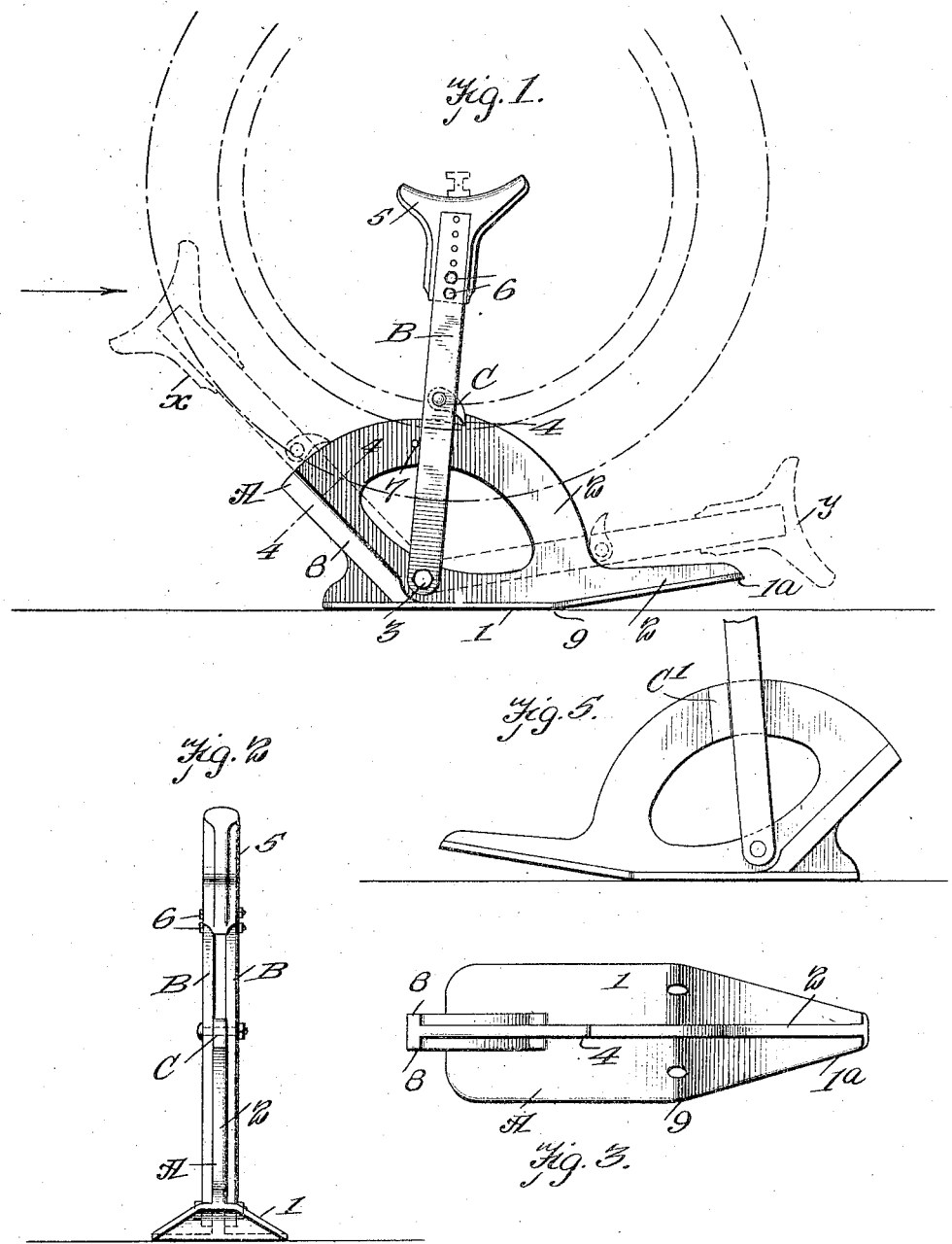

WILLIAM T. ADAMS, OF CORINTH, MISSISSIPPI.

VEHICLE-JACK.

1,057,315. Specification of Letters Patent. Patented Mar. 25, 1913.

Application filed April 3, 1912. Serial No. 688,199.

*To all whom it may concern:*

Be it known that I, WILLIAM T. ADAMS, a citizen of the United States, and a resident of Corinth, in the county of Alcorn and State of Mississippi, have invented an Improvement in Vehicle-Jacks, of which the following is a specification.

My improved jack is adapted for lifting wheels of vehicles, especially automobiles, when the vehicles are run over the jack, so that the latter engages the axles.

I have devised an improved construction of the jack, especially the body or frame of the same, and the details of construction are as hereinafter described, and illustrated in the accompanying drawing, in which—

Figure 1 is a side view of one form of the jack. Fig. 2 is an end view. Fig. 3 is a top view of the body or frame. Fig. 4 is a cross section on the line 4—4 of Fig. 1. Fig. 5 is a side view of a modification.

The jack shown in the first four figures will be first described. The jack is formed of three parts, namely, a body or frame A constructed of metal, preferably cast, an axle-support or bar B which is pivoted to said body, and a pawl C which is pivoted to the bar or axle-support and adapted to engage a stop formed on the body. The latter has a broad base 1 consisting of flanges extended laterally, and a vertical web or flange 2, which is preferably cast integral with the base and extends lengthwise thereof centrally. The web or flange 2 is curved on its upper edge and is thus approximately segmental in form. The axle-support B is a bar made of two like, parallel, longitudinal members which receive the web 2 between them and are pivoted to the latter at 3 adjacent to the flanged base and near the front end of the same. The pawl C is pivoted between the members of the axle-support B at a point just outside the curved edge of the web 2 and is adapted to ride over the latter, but may be locked with a stop 4 consisting of a projection or shoulder, as shown in Fig. 1. The upper end of the axle-support B has a series of holes, and a saddle-like block 5 is secured adjustably between the ends of the members, as shown, the securing means consisting of bolts 6 passing through the coincident holes of the two parts. It is thus apparent that the block may be adjusted higher or lower as may be required to accommodate the jack to different vehicles. The axle-support B is shown in full lines in the position in which it serves to support a vehicle axle; that is to say, it is thrown slightly back from the vertical, the pawl C being engaged with the stop 4; and a pin may be inserted through the web 7 to hold the axle-support in that position. In order that the axle-support B may be inclined slightly when in the normal position, shown by full lines in Fig. 1, the stop is necessarily located a little out of vertical alinement with the pivot of said support. To adapt the axle-support B for engagement with the axle of a vehicle, say an automobile, it is thrown forward to the position shown by dotted lines $x$, and is supported in that inclined position by means of lateral flanges 8 which are formed integrally with the forward edge of the body A and inclined at an angle of about 45°. It is obvious that in this position the saddle block 5 is lowered so as to be in the same horizontal line as the axle of the vehicle. Upon contact of the axle therewith, the driving wheels of the auto being revolved, the axle will be carried upward and backward to the position indicated in Fig. 1. Should the impetus be sufficient, the jack may be tilted rearward, as will be understood by observing the form of the base 1. It will be seen that it is constructed at an obtuse angle, the rearwardly extended portion $1^a$ being at a sufficient angle to the remaining portion of the base to permit a slight rocking movement at the point 9, which is the apex of the angle. When the jack is not in use, the axle-support B may be turned down to the right, to the position indicated by dotted lines $y$ in Fig. 1, and thus the jack as a whole will occupy comparatively small space and may be conveniently carried in the auto or other vehicle when required.

In the jack shown in Fig. 5, a pawl is dispensed with and the arched web provided with a fixed abutment C' with which the bar B is adapted for contact when thrown back past the vertical as shown. Thus the bar B is adapted to shift between the two stops C' and 8.

In Fig. 3, the base is shown provided with two oblong holes for reception of screw-bolts for holding the jack stationary on a floor when required. The bolts will, however, fit so loosely in the holes that the jack may still have a rocking motion. Ordinarily, however, the jack will be used without being secured to the floor in this manner.

What I claim is:—

1. The improved vehicle jack, comprising a body formed of a flanged base and a vertical segmental web extending along the longitudinal middle of said base and having a stop on its upper edge, and an axle-support consisting of a bar pivoted to the body and provided with a device adapted for engagement with said stop, substantially as described.

2. The improved vehicle jack, comprising a body formed of a flanged base and a vertical central web which is approximately segmental in form and provided at its forward end with lateral extensions, and an axle-support comprising a bar pivoted to the lower portion of said web and adapted to swing forward into contact with the said extensions, substantially as described.

3. The improved vehicle jack, comprising a metal body formed of a flanged base whose rear portion extends upward at a slight angle and a vertical web extending longitudinally of the base and having a stop on its upper edge, an axle-support consisting of a bar pivoted to the lower portion of the web and having a pawl adapted to engage said stop, which latter is located at a point out of vertical alinement with the pivot of the support, as shown and described.

WILLIAM T. ADAMS.

Witnesses:
H. E. MEEKS,
J. O. SWAIM, Jr.